United States Patent [19]

McCullough

[11] 4,130,839

[45] Dec. 19, 1978

[54] CIRCUITRY FOR A FACSIMILE RECEIVER FOR REGENERATION OF CARRIER FOR AN AMPLITUDE MODULATED SUPPRESSED CARRIER SIGNAL

[75] Inventor: Timothy L. McCullough, Stillwater, Minn.

[73] Assignee: Minnesota Mining and Manufacturing Company, Saint Paul, Minn.

[21] Appl. No.: 832,222

[22] Filed: Sep. 12, 1977

[51] Int. Cl.² .............................................. H04N 1/40
[52] U.S. Cl. ..................................... 358/281; 358/280
[58] Field of Search ............... 358/257, 265, 266, 280, 358/281

[56] References Cited

U.S. PATENT DOCUMENTS 3,673,322   6/1972   Baxter ................................... 358/281

*Primary Examiner*—Howard W. Britton
*Attorney, Agent, or Firm*—Cruzan Alexander; Donald M. Sell; Robert L. Marben

[57] ABSTRACT

Circuitry for a facsimile receiver for regenerating a carrier signal from the full-wave rectified signal obtained from a received signal which includes an amplitude modulated suppressed carrier signal and periodic short intervals of unmodulated carrier, each interval being synchronous with a position signal produced at the facsimile receiver each time the phase position of the receiver is reached. The circuitry includes a phase lock loop (PLL) which functions as a sample data PLL. A switching means limits closed loop operation of the circuitry to those times when the short interval unmodulated carrier is received during a time slot provided by the switching means each time the facsimile receiver reaches its phase position. In a preferred embodiment, the loop is also closed (sampled) when other periods of unmodulated carrier is present in the received signal to which the switching means responds. A bandwidth modifying circuit portion connected to the filter for the PLL automatically provides a greater bandwidth for the PLL when the PLL frequency is far from the desired lock frequency. The capture range of the PLL is quite narrow and the filter for the PLL is designed so the filtered error signal responds much slower than the sample rate.

11 Claims, 2 Drawing Figures

CIRCUITRY FOR A FACSIMILE RECEIVER FOR REGENERATION OF CARRIER FOR AN AMPLITUDE MODULATED SUPPRESSED CARRIER SIGNAL

BACKGROUND OF THE INVENTION

1. Field of the Invention

This invention relates to circuitry for the regeneration at a facsimile receiver of the carrier signal from a signal which includes an amplitude modulated suppressed carrier signal plus periodic periods of unmodulated carrier. In particular, the invention relates to such circuitry utilizing a phase lock loop to obtain the carrier signal.

2. Description of the Prior Art

There are facsimile machines which use an amplitude modulated vestigial side band (AMVSB) system wherein the signal contains a net carrier signal which is available at the receiver for recovery and use in synchronously demodulating the amplitude modulated signal. This net carrier signal does not contain useful information data. Since commercial telephone lines used for interconnecting facsimile machines limit the total power level of the signal that can be transmitted, it is desirable that the net carrier be suppressed. The resulting suppressed carrier system provides a greater signal to noise ratio than an unsuppressed carrier system. Elimination of the net carrier, however, requires that a suitable way be found to regenerate the carrier signal at the facsimile receiver for synchronously demodulating the received AMVSB suppressed carrier signal.

Standards have been adopted to ensure compatability between facsimile machines of different manufacture when operated in an amplitude modulation mode, which includes AMVSB suppressed carrier systems. The standards provide for an initial synchronizing time period (approximately 6 seconds) during which full carrier is transmitted. During this initial time period, the full carrier is interrupted regularly (once every scan line) to provide a short phase period (10 m. seconds) of no carrier. The initiation of these regular short interruptions is controlled in the case of a drum-type facsimile by the phase or "start" position of the transmitter drum. These regular short interruptions are phasing periods and are used by the receiving facsimile machine to synchronize the position of its drum or comparable device to that of the transmitter drum. Once synchronization is completed, the transmitter begins to scan the document and to transmit the scanned information via the AMVSB suppressed carrier system. In such a system, unmodulated carrier is present during the scan of white areas of the document and during each of the short phase periods which continue to occur regularly during the transmission operation.

The carrier signal needed at the receiver for demodulation of the AMVSB suppressed carrier signal could be obtained by full wave rectifying the received signal and feeding the resultant doubled frequency signal to a phase lock loop (PLL). This technique may work; however, there is no guarantee that there will always be carrier during the document transmission, e.g., no carrier exists for a black copy. Each phase period is known to contain full carrier, but it is present only for a brief time each scan line. A conventional PLL system would drift and jitter considerably when locked on such a signal. Furthermore, any carrier portions provided in the received signal that correspond to white areas in the document being scanned are not consistently of a sufficient duration to provide a basis for the regeneration of the carrier without the presence of the foregoing problem.

SUMMARY OF THE INVENTION

This invention provides for the regeneration of carrier from an amplitude modulated suppressed carrier signal, such as an AMVSB suppressed carrier signal, as used in facsimile systems without the presence of the phase jitter and drift problem that is encountered when the above-mentioned conventional PLL system is utilized. The invention is embodied in circuitry for a facsimile receiver when operated in an amplitude modulation suppressed carrier mode and includes a PLL to which the full rectified received signal is applied, the PLL having a phase comparator which receives the rectified signal, a lowpass filter means and a voltage controlled oscillator (VCO). The VCO provides a square wave signal as the second input to the comparator and a triangular wave signal which provides a needed 90° phase shift function. A divider is included in the circuitry which responds to the triangle wave signal after it has been limited to provide a signal having the frequency of the carrier and either in phase or 180° out of phase with the carrier. The circuitry also includes switching means connected between the comparator and low-pass filter which is arranged to limit the time when the circuitry functions as a closed loop PLL. The loop is closed (sampled) in response to the presence of a period of unmodulated carrier during the time an information signal is received or the presence of a period of unmodulated carrier during a time slot provided each time the drum or comparable device of the facsimile receiver reaches its "start" or phase position. In addition, the operation of the filter is automatically modified to provide a greater bandwidth for the PLL in the event the output from the comparator (error feedback) indicates the PLL frequency is far from the desired lock frequency.

While not of major importance to the stability or loop response, the filter function that is provided when a period carrier is present during the time an information signal is received serves to "fine tune" the PLL. In this case, the switching means operates to connect the output of the comparator to the filter so that it operates with a long time response which, though not effective to respond to any large error that may be indicated by the output of the phase comparator, is effective to average out any small error that may be present and also serves to compensate for any leakage current present in the filter. Only slight modification of the switching means and filter is required to eliminate this feature.

DESCRIPTION OF THE DRAWINGS

The invention will be better understood from the following description considered in connection with the accompanying drawings in which an embodiment of the invention is illustrated by way of example. It is to be expressly understood that the drawings are for purposes of illustration and description only and are not intended as a definition of the limits of the invention.

DETAILED DESCRIPTION

Figure 1:
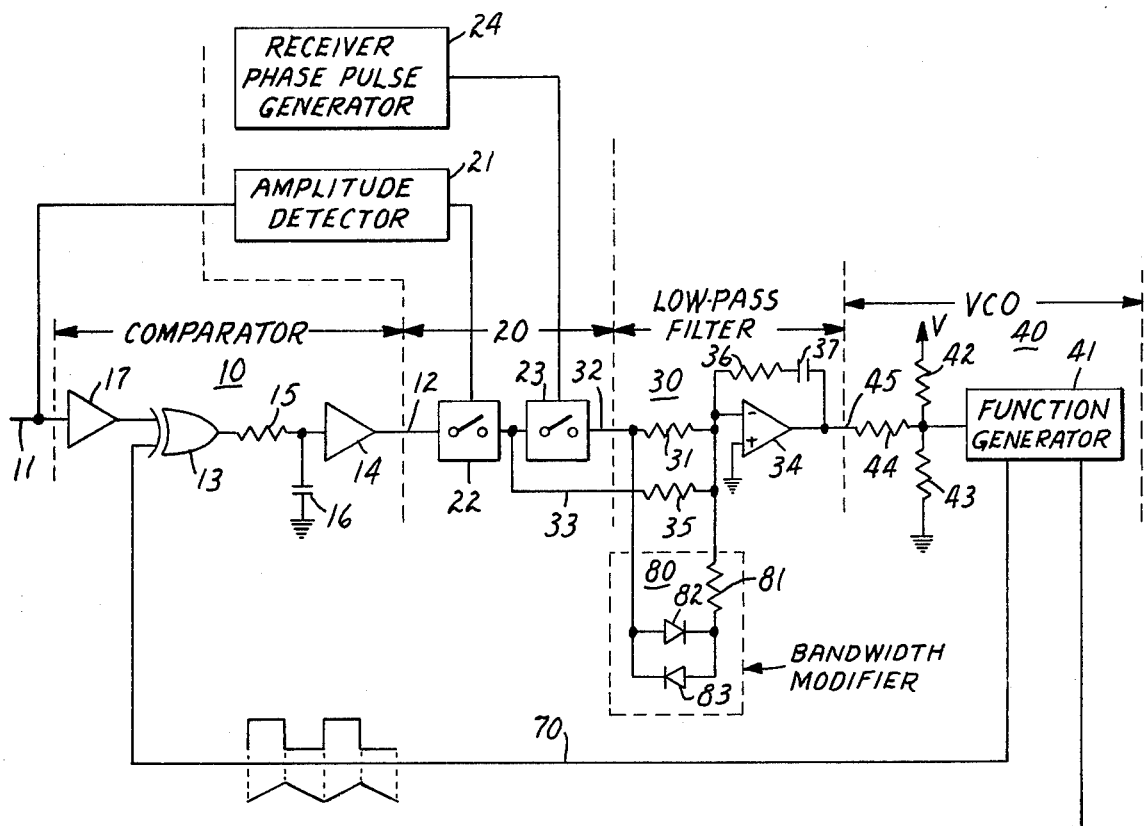
FIG. 1 is a schematic showing of the circuitry embodying the invention.

Referring to FIG. 1, circuitry is shown in schematic form which embodies the invention and includes a phase comparator 10, switching means 20, a low-pass filter 30, a voltage controlled oscillator (VCO) 40, a limiter 50 and a divider 60. The comparator, when connected to the low-pass filter by the switching means, the VCO and a feedback connection 70 from an output of the VCO to an input of the comparator provide a phase lock loop (PLL) circuit. The switching means 20 provides a sample data mode of operation for the PLL. Included in the circuitry of FIG. 1 is a bandwidth modifying circuit 80 which is connected across the resistor 31 of the filter 30.

A basic phase lock loop (PLL) includes a phase comparator, a low-pass filter and a voltage controlled oscillator (VCO), the output of which is fed back to an input of the comparator.

Referring to FIG. 1, the basic principle of operation of such a PLL can be explained as follows: When a signal is not present at the input 11 of the comparator, the voltage which is presented to the VCO from the filter 30 is zero relative to the free running bias voltage for the VCO. The VCO is adjusted to operate at a "free running" frequency which corresponds to the free running bias voltage that is provided. When an input signal is applied to the comparator at its input 11, the comparator compares the phase and frequency of such input signal with the signal obtained via the feedback connection 70 from the VCO to provide an error voltage at the comparator output 12 which is related to the phase and frequency difference between the two signals. This error signal is filtered by the filter 30 and applied to the control input 45 of the VCO to force the VCO frequency to change in a direction that reduces the frequency difference between the VCO signal and the input signal to the comparator. If the frequency of the two signals are sufficiently close, the feedback nature of the PLL causes the VCO to synchronize or "lock" with the incoming signal. Once the lock condition is established, the VCO frequency is identical to the input signal, except for a finite phase difference which is necessary to produce an output from the filter 30 for shifting the VCO frequency from its free running frequency to the frequency of the input signal to the comparator. This selflocking ability of the system causes the PLL to track the frequency of changes that occur in the input signal once the PLL is locked. Operation of a PLL, as described, requires the input signal to the comparator to be present at all times if the output of the VCO is to be completely free of phase jitter and drift.

In the case of a facsimile system where the modulation scheme is amplitude modulation with vestigial side band filtering (AMVSB) with the data encoded such that there exists no net D.C. in the baseband, no net carrier signal is present in the modulated signal. Standards for a facsimile system of this type require unmodulated carrier to be transmitted for a short period of time for each line scan. For example, for one transmission speed the standards require unmodulated carrier to be sent for about 8 milliseconds of every 166 milliseconds. The basic PLL that has been described could be used to regenerate the carrier at the receiver if the facsimile signal were first field wave rectified before being applied to the comparator 10. As has been mentioned, this would work, but phase jitter and drift would be present at the output of the VCO, since the loop would try to "correct" when no period of unmodulated carrier is being received.

This problem is eliminated by the use of the switching means 20 which serves to limit the time when the circuitry of FIG. 1 is connectd to function as a closed loop PLL by selectively connecting the filter 30 for operation dependent on the presence of a period of unmodulated carrier in an information signal received or the presence of unmodulated carrier during a time slot provided in response to the drum of the facsimile receiver reaching its "start" or phase position. Unmodulated carrier will be present in the information signal when white areas of a document are scanned at the facsimile transmitter. The manner and extent to which the filter 30 provides its bandwidth is also important, as will be explained.

The switch means 20 includes an amplitude detector 21 which is shown connected to the input 11 of the comparator 10 for responding to a period of unmodulated carrier in the received signal. The amplitude detector 21 could also be connected to respond to the received signal before it is rectified. The switch means 20 also includes a first switch 22 connected to the output of comparator 10 and connected for control by the output of the amplitude detector. The first switch 22 is schematically shown to illustrate its function. In practice, the switch 22 is an electronic switching device, e.g., a field effect transistor. The amplitude detector 21 responds to the presence of a period of unmodulated carrier in the received signal to provide a control signal which is effective to operate the switch 22 so as to pass any signal from the output of the comparator 10 to a first input 33 of the filter 30 and to a second switch 23 of the switch means 20.

In addition to the second switch 23, which may be of the same form as switch 22, the switch means 20 also includes a receiver phase pulse generator 24 connected for controlling the operation of the switch 23. The generator 24 provides a signal in response to a position signal produced at the receiver each time the phase or "start" position of the drum of the facsimile receiver is detected. Such position signals are used when the transmitter and receiver drums are initially synchronized and continue to be produced at the receiver following the synchronization of the transmitter and receiver. The signal from generator 24 corresponds in duration to the short period of time that unmodulated carrier is specifically transmitted by the facsimile transmitter for each line scan. Detection of the drum position can be accomplished in a number of ways which are well known in the art. The signal from generator 24 is effective to operate the switch 23 to connect the output of switch 22 to second input 32 of the low-pass filter 30.

With the described arrangement for the switch means 20, it can be seen that it functions to provide an error signal from the comparator to the input 33 of the filter 30 and to switch 23 at the time the received AMVSB signal contains a period of unmodulated carrier, i.e., when the facsimile transmitter is scanning white areas of the document for at least such a period and during the phase pulse period provided for each line scan. The switch means 20 also functions to connect the output 12 of the comparator 20 to the input 32 of filter 30 when two conditions are satisfied at the same time, i.e., when a time slot provided by a signal receiver phase pulse generator 24 to operate switch 23 is present and there is a period of unmodulated carrier based signal detected by the amplitude detector 21 to cause switch 22 to be operated. If the transmit and receive machines of the facsimile system have been synchronized properly, the time slot provided by the generator 24 will occur when carrier is sent for the required short period of time for each line scan. It is thus assured that the carrier provided to the facsimile receiver is synchronously sampled by the PLL, since an error signal based on the difference in frequency and phase between a signal derived from carrier and the signal received by the comparator 10 from the VCO 40 will be presented to the input 32 of the filter 30 for a short time for each scan line.

The filter 30 includes an operational amplifier 34 which has its non-inverting input connected to ground. Its inverting input is connected to the inputs 32 and 33 of the filter via a resistor 31 and a resistor 35, respectively. The resistor 35 is on the order of 8 to 10 times larger than resistor 31. The filter 30 also includes a resistor 36 and a capacitor 37 connected in series between the output of the operational amplifier 34 and its inverting input. The filter components provided in connection with the operation of the filter 30 when the synchronous sample error signals are applied to the input 32 are selected so the capture range, i.e., the range of frequencies over which the PLL can acquire lock with an incoming signal, is quite narrow. For examle, for an AMVSB suppressed carrier system usable in a facsimile system where 2100 Hz has been selected as a standard frequency for the carrier, a capture range of 2100 Hz ± 100 Hz has been deemed acceptable. This corresponds to a capture range of 4200 Hz ± 200 Hz as seen by the PLL. Such filter components are also selected so the filtered error signal responds much slower than the sample rate. A filter providing an error signal having frequency components where the highest frequency is on the order of one-half the sample rate is satisfactory.

The samples of carrier based error signals provided to the filter 30 solely in response to the operation of switch 22 are applied to the input 33 of filter 30 causing the resistor 35 to determine the operation of filter 30 in place of the resistor 31 in parallel with resistor 35. Since resistor 35 is very much larger than resistor 31, the filtered error signal provided when only input 33 is receiving an error signal responds much slower than the filtered error signal obtained when an error signal applied to the filter inputs 32 and 33. This permits the filter 30 to respond to error signals provided to the filter 30 solely in response to the operation of switch 22, which may occur between the application of the error signals that are provided on a synchronous sampling basis, to provide some additional, but limited, correction to the operation of the VCO.

There may be times when the magnitude of the error signal from comparator 10 that is applied to the input 32 may be quite large making it desirable, when this occurs, to effect an increase in the bandwidth of the PLL to hasten the capture process. This can be accomplished by increasing the bandwidth of the filter 30. The bandwidth modifying circuitry 80 connected across resistor 31 is provided for this purpose and includes the resistor 81 which is connected in series with the two parallel, but oppositely poled, diodes 82 and 83. Accordingly, when the error is large enough in one direction, the diode 82 will conduct and when the error is large enough in the opposite direction, diode 83 will conduct. Conduction of either of the diodes 82 and 83 is effective to place the resistor 81 in parallel with resistor 31 to alter the operation of the filter 30 in the desired manner.

The VCO 40 includes a function generator 41, which may be a 566 type function generator available from National Semiconductor Corporation plus the resistor network that includes the resistors 42, 43 and 44. Resistors 42 and 43, which are connected in series between a voltage V and ground, provide a voltage to the function generator 41 which is adjusted to free run at twice the carrier frequency, e.g., 4200 Hz. The resistors 42, 43 and 44 are selected to provide an overall VCO gain of about 100 Hz/volt.

The function generator 41 provides two signal outputs for the VCO. One output is a square wave signal which is applied via the conductor 70 to an input for the comparator 10, while the other output is a triangular signal which is in phase with the square wave signal. The triangular signal output appears on conductor 90 which is connected to the limit circuit 50, which includes a coupling capacitor 51, a biasing resistor 52 and a limiting amplifier 53. The output of the limiter 53 is a square wave shifted 90° from the square wave signal provided on conductor 70. Since this shifted square wave signal is at a frequency that is twice the frequency of the desired carrier signal, the output of the limiter amplifier is applied to a divider circuit 60 for dividing the frequency of the signal by two. The divider circuit 60 can, for example, be a flip-flop circuit. The output of the divider 60 will then be a signal having the frequency of the carrier signal and will either be in phase or 180° out of phase with the carrier signal. A signal is thus available at the output of the divider 60 which can be used to demodulate the AMVSB signal that is received at the facsimile receiver.

Figure 2:
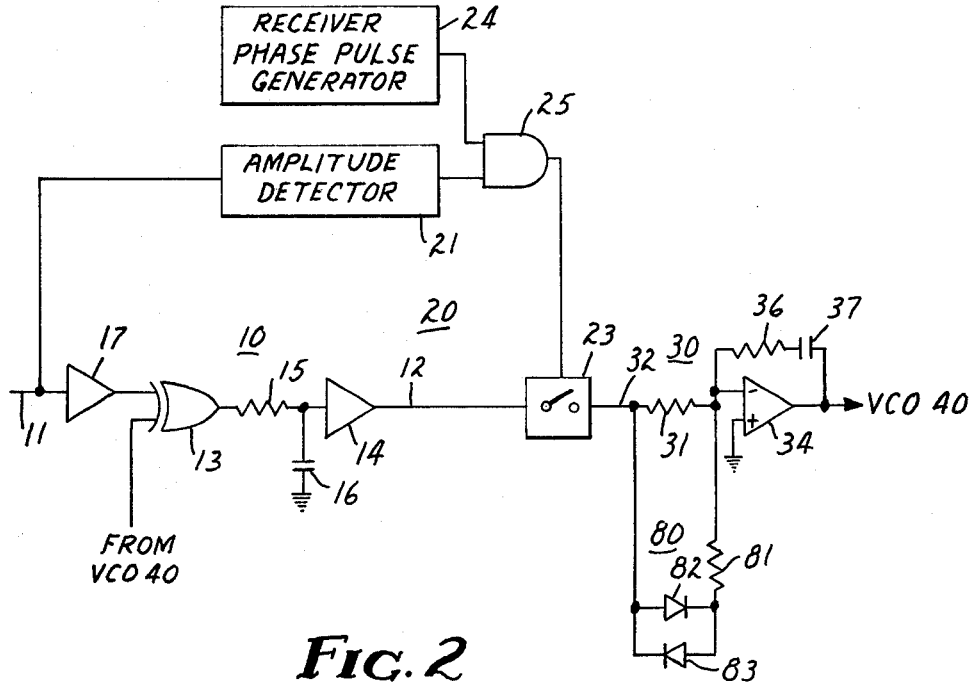
FIG. 2 is a schematic showing of a modification of a portion of the circuitry of FIG. 1.

As has been mentioned, the use of the error signals that are applied to the filter 30 solely in response to operation of switch 22 cause only limited correction of the operation of the VCO 40 and, as such, are not important to the stability or loop response. There may be applications where the "fine tuning" provided by such error signals is not needed. In such cases, the resistor 35 or the connection between the switch 22 and resistor 35 can be removed or the arrangement of FIG. 2 can be used. FIG. 2 shows a modification to the circuit of FIG. 1 wherein only the input 32 to filter 30 is used and only one of the switches 22 or 23 is used for controlling the application of an error signal to only the filter 30. In the arrangement of FIG. 2, the amplitude detector 21 and the phase pulse generator 24 are connected to an AND circuit 25 so that switch 23 is operated only when the AND circuit 25 receives a signal from the detector 21 and the generator 24, i.e., when the signal received by the facsimile receiver contains a period of unmodulated carrier and the phase pulse generator 24 is providing a time slot in response to detection of the drum of the receiver reaching the phase or "start" position.

It will be apparent to those skilled in the art that other arrangements and connections of the switching means 20 to the PLL can be made to provide the error signal applying functions that has been described for the switch means 20.

The comparator 10, which has not been described in any detail, may take on a number of forms which are known in the PLL prior art. The comparator 10 shown in FIG. 1 includes a limiter 17 connected to the input 11 to provide a logic signal to one input of an exclusive OR circuit 13. The other input to the exclusive OR circuit is connected to conductor 70 from the VCO. The output of the exclusive OR circuit is coupled to an amplifier 14 via a filter which includes the resistor 15 and capacitor 16. The filter acts to remove unneeded 8400 Hz frequency components and thus prevent the amplifier from saturating and to restrict the A.C. excursions in the feedback path. The time constant of the filter is selected to be much smaller than the time constant of the PLL so as not to affect the overall loop response or stability.

While the foregoing detailed description has been made in connection with the regeneration of carrier for an AMVSB carrier suppressed signal as used in facsimile systems, the invention is also applicable to other amplitude modulated suppressed carrier signals that may be used in facsimile systems where the signal that is used includes an amplitude modulated suppressed carrier signal plus periodic periods of unmodulated carrier, each interval being synchronous with a position signal that is produced at the facsimile receiver each time the receiver reaches its phase position.

What is claimed is:

1. Circuitry for a facsimile receiver for regenerating a carrier signal from the full-wave rectified signal obtained from a received signal which includes an amplitude modulated suppressed carrier signal and periodic short intervals of unmodulated carrier, each short interval being synchronous with a position signal produced at the facsimile receiver each time the phase position of the receiver is reached, including:
   a phase lock loop including a phase comparator having first and second inputs, said first input connected for receiving the full-wave rectified signal, a low-pass filter means, a VCO having an input operatively connected to the output of said filter means and output operatively connected to said second input of said comparator, said VCO having a free run frequency that is twice the frequency of the carrier signal;
   switch means operatively connected to said facsimile machine for providing a time slot for each of the position signals and operatively connected for responding to the received signal for detecting periods of unmodulated carrier, said switch means connected to said phase lock loop for operatively connecting the output of said comparator to said filter means when one of the short intervals of unmodulated carrier is detected by said switching means during said time slot; and
   a divider operatively connected to the output of said VCO for providing a signal having a frequency that is one-half the frequency of the signal presented at the output of the VCO.

2. Circuitry according to claim 1 wherein said phase lock loop includes a bandwidth modifying circuit connected to said filter means for increasing the bandwidth of the filter means when the output of said comparator exceeds a predetermined magnitude.

3. Circuitry according to claim 2 wherein said filter means includes a resistive portion across which said bandwidth modifying circuit is connected, said modifying circuit including a resistive portion connected in series with two parallel connected and oppositely poled diodes.

4. Circuitry according to claim 1 wherein said filter means includes a first input and a second input, the output of said comparator operatively connected via said switching means to said first input of said filter means whenever one of the periodic short intervals of unmodulated carrier is detected by said switching means during said time slot and to said second input of said filter means whenever any period of unmodulated carrier is present in the received signal is detected by said switch means.

5. Circuitry according to claim 4 wherein said filter means includes a first resistive portion and a second resistive portion, each of said portions having one end connected to said first and second inputs of said filter means, respectively, with the other end of each of said portions connected together, the resistance of said first resistive portion being much larger than the resistance of said second resistive portion.

6. Circuitry according to claim 1 wherein said switching means includes a pulse generator for providing said time slot and an amplitude detector for detecting periods of unmodulated carrier.

7. Circuitry according to claim 6 wherein said switching means includes at least one switch to which said pulse generator and said phase detector are operatively connected, said one switch operatively connecting said output of said comparator to said filter means.

8. Circuitry according to claim 1 wherein said switching means includes a pulse generator for providing said time slot, an amplitude detector for detecting periods of unmodulated carrier and two switches operatively connected in series for controlling the connection of the output of said comparator to said filter means, said pulse generator operatively connected to one of said two switches for controlling its operation in response to said time slot, and said amplitude detector operatively connected to other of said two switches for controlling its operation in response to detection of periods of unmodulated carrier.

9. Circuitry according to claim 8 wherein said filter means has a first and second input, said first input of said filter means operatively connected to a point intermediate said two switches and said one of said two switches having its output operatively connected to said second input of said filter means.

10. Circuitry according to claim 1 wherein said filter means provides an error signal to said VCO having the highest frequency component that is on the order of one-half the rate at which the periodic short intervals of unmodulated carrier are provided in the received signal.

11. Circuitry according to claim 10 wherein the capture range of the phase lock loop is the free run frequency of the VCO plus or minus on the order of 5 percent of said free run frequency.

* * * * *